(12) United States Patent
Nagase et al.

(10) Patent No.: US 7,546,830 B2
(45) Date of Patent: Jun. 16, 2009

(54) INJECTOR DRIVE DEVICE AND INJECTOR DRIVE SYSTEM

(75) Inventors: Noboru Nagase, Anjo (JP); Takashi Kikutani, Ama-gun (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 11/806,322

(22) Filed: May 31, 2007

(65) Prior Publication Data

US 2007/0289579 A1 Dec. 20, 2007

(30) Foreign Application Priority Data

Jun. 14, 2006 (JP) .............................. 2006-164969
Mar. 2, 2007 (JP) .............................. 2007-052943

(51) Int. Cl.
*F02M 51/00* (2006.01)

(52) U.S. Cl. ...................... 123/490; 361/140; 361/142; 361/152; 361/154; 361/156

(58) Field of Classification Search ................. 123/490; 361/140, 142, 152, 154, 156

See application file for complete search history.

(56) References Cited

U.S. PATENT DOCUMENTS

| | | | | |
|---|---|---|---|---|
| 4,486,703 A | | 12/1984 | Henrich | |
| 5,934,258 A | * | 8/1999 | Watanabe | ................... 123/490 |
| 6,031,707 A | * | 2/2000 | Meyer | ......................... 361/153 |
| 6,135,096 A | * | 10/2000 | Bolz et al. | ................... 123/490 |
| 6,209,513 B1 | * | 4/2001 | Sakasai et al. | ............... 123/299 |
| 7,059,304 B2 | * | 6/2006 | Manzone et al. | ............. 123/490 |
| 7,117,852 B2 | * | 10/2006 | Santero et al. | ............... 123/490 |

FOREIGN PATENT DOCUMENTS

| | | |
|---|---|---|
| JP | A-06-264810 | 9/1994 |
| JP | U-3024456 | 2/1996 |
| JP | A-10-299551 | 11/1998 |
| JP | A-2002-101673 | 4/2002 |
| JP | A-2005-016431 | 1/2005 |

* cited by examiner

*Primary Examiner*—Erick Solis
(74) *Attorney, Agent, or Firm*—Posz Law Group, PLC (57) ABSTRACT

An injector drive device includes a power supply unit that is supplied with power from a battery mounted in a vehicle and generates a voltage higher than the voltage of the battery, and EDU having a drive unit that is supplied with power from the power supply unit and drives an injector. The drive unit is housed in a housing. The power supply unit is placed externally to the EDU, that is, externally to the housing, so that the housing need not be made large against heat generation of the power supply unit.

7 Claims, 6 Drawing Sheets

INJECTOR DRIVE DEVICE AND INJECTOR DRIVE SYSTEM

CROSS REFERENCE TO RELATED APPLICATION

This application is based on and incorporates herein by reference Japanese Patent Applications No. 2006-164969 filed on Jun. 14, 2006 and No. 2007-52943 filed on Mar. 2, 2007.

FIELD OF THE INVENTION

The present invention relates to an injector drive device and a injector drive system that drive an injector for injecting fuel and, in particular, to an injector drive device and an injector drive system that are applicable to a vehicle using an internal combustion engine such as a diesel engine as a driving source or an engine-motor hybrid vehicle that is driven by a combination of an internal combustion engine and an electric motor.

BACKGROUND OF THE INVENTION

A conventional injector drive device (for example JP-2005-16431A) includes a power supply unit such as a DC-DC converter, and a drive switch unit (injector drive unit) that is supplied with power from the power supply unit and drives an injector and the like. In the power supply unit, a voltage (12V or 24V) supplied from a battery is raised or boosted to a high voltage of tens to hundreds of volt and is supplied to the injector drive unit.

In recent years, it is required to finely control fuel injection to reduce noxious substances contained in emission gas. To cope with this, it is required to increase the number of times of fuel injection by injector operation. If the number of times of injector operation is increased, energy for driving an injector is correspondingly increased. Therefore, it is required to increase the power output capacity of the power supply unit, and this increases the amount of heat produced in the power supply unit.

The power supply unit is usually housed in a housing of the drive switch unit. Heat produced in the power supply unit or an injector drive unit is radiated to the atmosphere through the housing. When the amount of heat produced in the power supply unit is increased, it is required to increase the size of the housing in correspondence to increase in the amount of produced heat, thereby ensuring a required heat radiation capability. Therefore, when the capacity of the power supply unit is increased to increase the number of times of injector operation, the housing, that is, the drive switch unit, need be sufficiently large.

SUMMARY OF THE INVENTION

It is an object of the present invention to reduce an increase in the size of a drive switch unit even when the number of times of injector operation is increased.

According to one aspect, an injector drive device for driving a fuel injector of an engine has a power supply unit and a drive switch unit. The power supply unit is supplied with power from a battery and generates a voltage higher than the voltage of the battery. The drive switch unit has a drive unit that is supplied with power from the power supply unit and drives the injector. The drive unit is housed in a housing. The power supply unit is placed externally to the housing of the drive switch unit.

According to another aspect, an injector drive device for driving an injector for supplying fuel into an internal combustion engine of an engine-motor hybrid vehicle has a drive switch unit and an input terminal. The drive switch unit has a drive unit that is supplied with power from a high-voltage battery, which also supplies power to the electric motor, and drives an injector. The drive unit is housed in a housing. The input terminal is provided on the housing through which power from the battery is inputted. The drive unit is directly connected to the input terminal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
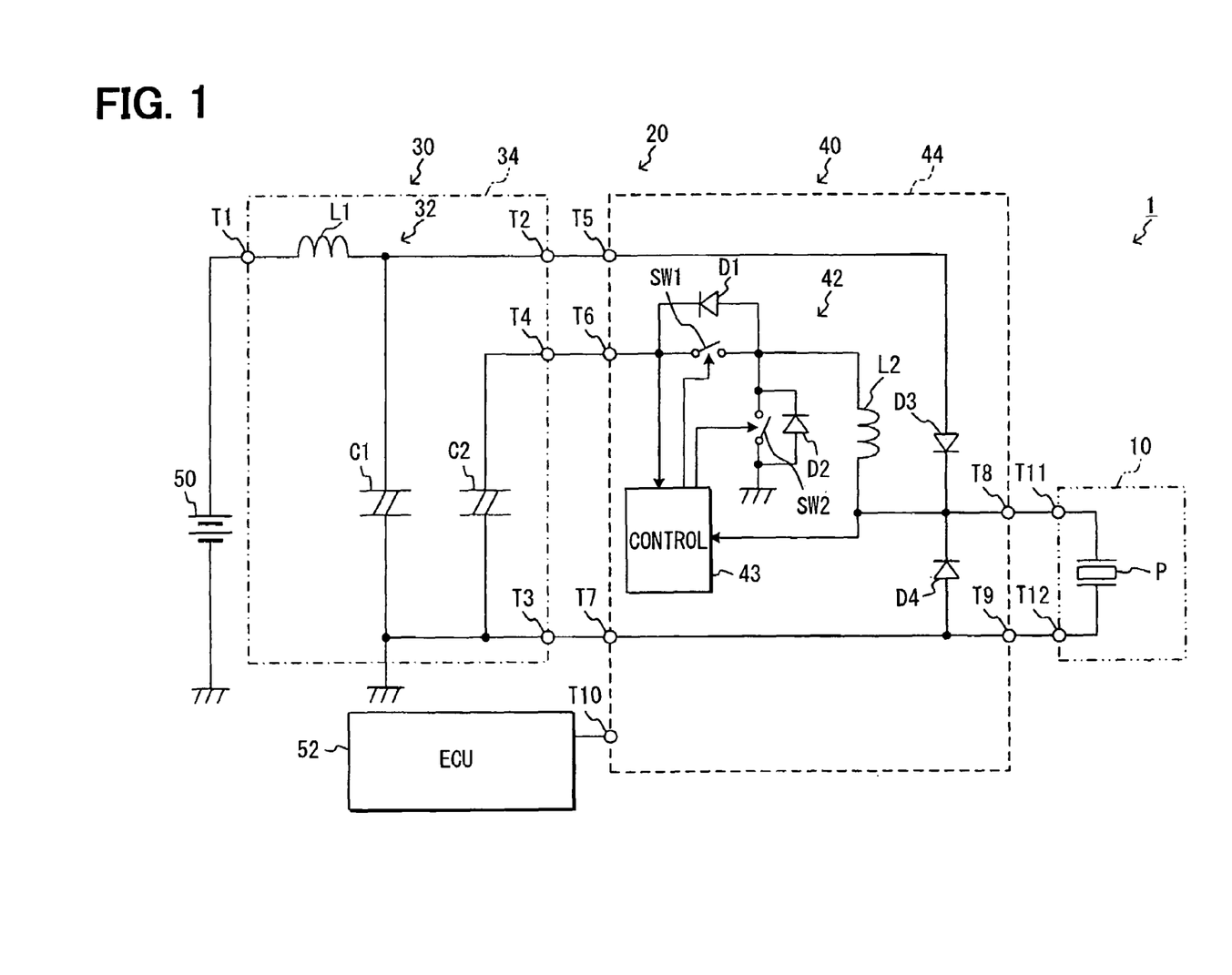
FIG. 1 is an electric circuit diagram showing an injector drive system according to in a first embodiment of the present invention.

An injector drive system 1 is mounted in a vehicle that has a diesel engine (not shown) as a vehicle driving source. This injector drive system 1 includes a fuel injector 10 for injecting fuel into the diesel engine, and an injector drive device 20 for driving the injector 10. The injector drive device 20 includes a power supply unit (first power supply unit) 30 that is supplied with power from a battery 50 mounted in the vehicle and generates a voltage higher than the voltage of the battery 50, and an electronic drive unit (EDU) 40.

In this embodiment, the battery 50 generates a voltage of 12V, and the power supply unit 30 generates a high voltage of tens to hundreds of volt. The power supply unit 30, EDU 40 and battery 50 are placed in an engine compartment in which the diesel engine is housed. The power supply unit 30 is placed externally to the EDU 40, that is, externally to the EDU 40.

The power supply unit 30 includes a filter 32 constructed of a coil L1 and a capacitor C1, a DC-DC capacitor C2, and a housing 34 for housing the filter 32 and the DC-DC capacitor C2. The housing 34 is formed of aluminum, resin, or the like. One end of the coil L1 of the filter 32 is connected to the positive terminal of the battery 50 through a terminal T1 provided on the housing 34. The other end is connected to the EDU 40 through a terminal T2 provided on the housing 34. One end of the capacitor C1 of the filter 32 is connected to the point of junction between the coil L1 and the EDU 40. The other end of the capacitor C1 is grounded and further connected to the EDU 40 through a terminal T3. The negative pole of the DC-DC capacitor C2 is connected to the point of junction between the capacitor C1 and the EDU 40. Its positive pole is connected to the EDU 40 through a terminal T4 provided on the housing 34.

The EDU 40 includes a drive unit 42 that is supplied with power from the power supply unit 30 and drives the injector 10, a control IC 43 that controls turn-on/off of a charge switch SW1 and a discharge switch SW2, and a housing 44 for housing the drive unit 42. The housing 44 of the EDU 40 is provided with terminals T5 to T7 connected to the power supply unit 30, terminals T8, T9 connected to the injector 10, and a terminal T10 connected to an electronic control unit (ECU) 52 that controls the engine of the vehicle. The housing 44 is formed of aluminum, resin, or the like. The drive unit 42 of the EDU 40 is connected directly to the terminal T6 without any circuit element such as a resistor. This drive unit 42 includes a charge switch SW1, a discharge switch SW2, a charging/discharging coil L2, and diodes D1 to D4.

The control IC 43 controls turn-on/off of the charge switch SW1 and the discharge switch SW2 in response to an injection signal inputted from the ECU 52 through the terminal T10. It thereby causes the drive unit 42 to drive the injector 10. One end of the charge switch SW1 is connected to the positive pole of the DC-DC capacitor C2 through the terminal T6 and the terminal T4. The other end is connected to one end of the charging/discharging coil L2. One end of the discharge switch SW2 is connected to the point of junction between the charge switch SW1 and the charging/discharging coil L2, and the other end is grounded.

The diode D1 is provided in parallel with the charge switch SW1. The anode of the diode D1 is connected to the charge switch SW1 on the charging/discharging coil L2 side, and its cathode is connected to the charge switch SW1 on the power supply unit 30 side. The diode D2 is provided in parallel with the discharge switch SW2. The anode of the diode D2 is connected to the discharge switch SW2 on the ground side, and its cathode is connected to the discharge switch SW2 on the charge switch SW1 side. The anode of the diode D3 is connected to the coil L1 and capacitor C1 of the filter 32 through the terminal T5 and the terminal T2, and its cathode is connected to the cathode of the diode D4. The anode of the diode D4 is connected to the negative pole of the DC-DC capacitor C2 and the capacitor C1 of the filter 32 through the terminal T7 and the terminal T3. It is also connected to the injector 10 through the terminal T9. The point of junction between the cathode of the diode D3 and the cathode of the diode D4 is connected to the injector 10 through the terminal T8. Further, it is connected to the other end of the charging/discharging coil L2 (the end on the opposite side to the charge switch SW1).

The injector 10 is a piezoelectric injector includes a piezoelectric element P, connectors T11, T12 connected to the terminals T8, T9 of the EDU 40, and a connector case (not shown) for protecting the connectors. One end of the piezoelectric element P is connected to the anode of the diode D4 through the connector T12 and the terminal T9 of the EDU 40. Further, it is connected to the negative pole of the DC-DC capacitor C2 and the capacitor C1 of the filter 32 through the connector T12, the terminals T9, T7 of the EDU 40, and the terminal T3 of the power supply unit 30. The other end of the piezoelectric element P is connected to the other end of the charging/discharging coil L2 (the end on the opposite side to the charge switch SW1) through the connector T11 and the terminal T8 of the EDU 40.

Although only one injector 10 and only one EDU 40 are shown in FIG. 1, the injector 10 and the EDU 40 are provided for each of the (four) cylinders of the engine, and the injectors 10 and EDUs 40 are connected in parallel.

Figure 2:
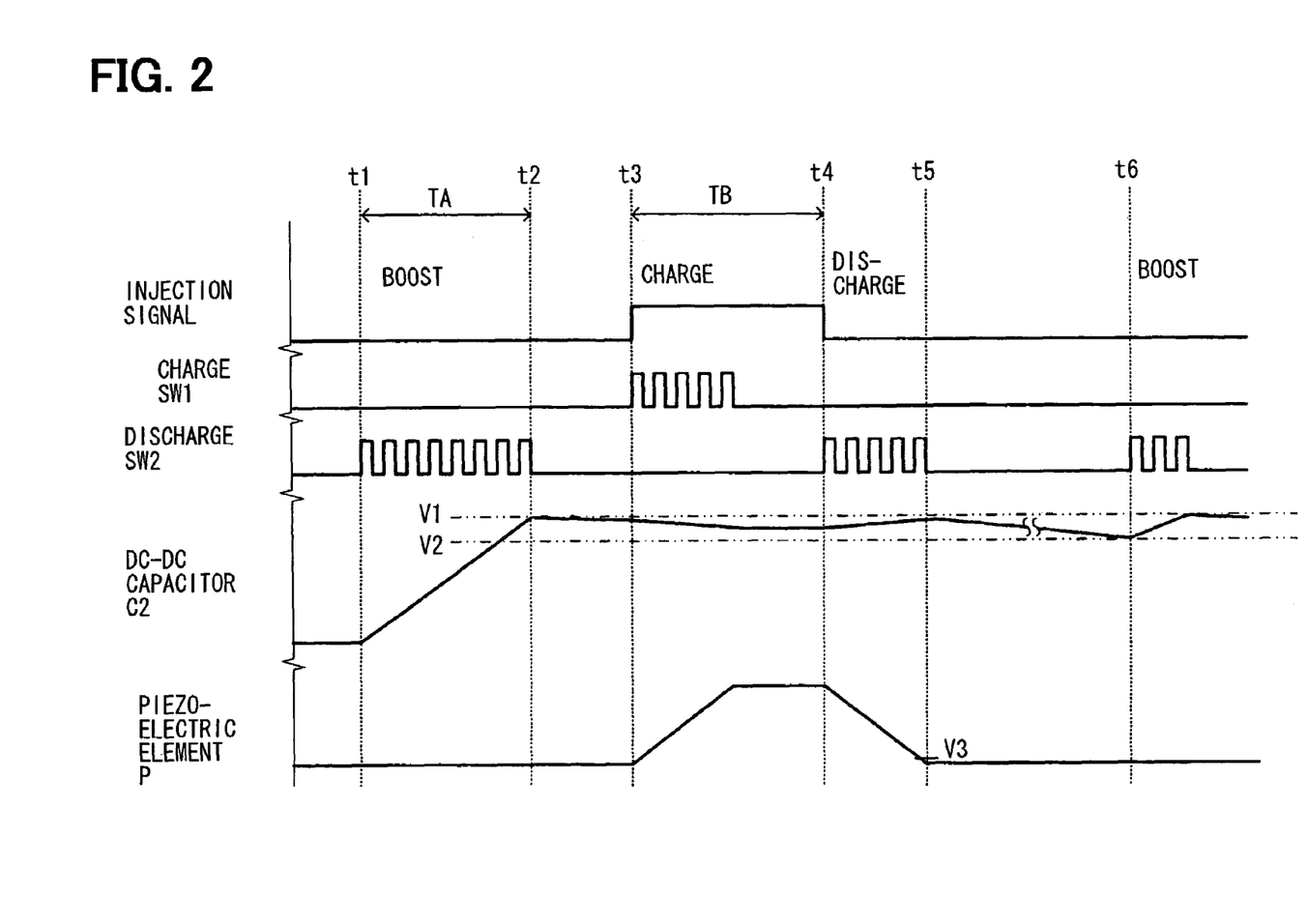
FIG. 2 is a time diagram showing the operation of the injector drive system in the first embodiment.

In this embodiment, as shown in FIG. 2, the EDU 40 drives the injector 10 when an injection signal is inputted from the ECU 52 to the EDU 40. The control IC 43 of the EDU 40 monitors the voltage of the power supply unit 30. When the EDU 40 is not driving the injector 10, the voltage of the power supply unit 30 is increased. The discharge switch SW2 operates as a boost switch for increasing (boosting) the voltage of the power supply unit 30. Further, the charging/discharging coil L2 operates as a boost coil for boosting the voltage of the power supply unit 30 (voltage of the DC-DC capacitor C2). When the EDU 40 repeatedly turns on and off the discharge switch SW2, energy is thereby accumulated in the charging/discharging coil L2 and the accumulated energy is supplied to the DC-DC capacitor C2. Thus, electric charges are accumulated in the DC-DC capacitor C2 and the voltage of the power supply unit 30 is increased.

The EDU 40 performs the operation of increasing the voltage of the power supply unit 30 (operation of turning on and off the discharge switch SW2). As shown in FIG. 2, this operation is carried out during the period from time t1, when the EDU 40 starts the voltage boosting operation, to time t2, when a time TA has passed and the voltage of the power supply unit 30 reaches a predetermined voltage V1. When the voltage of the power supply unit 30 drops below a predetermined voltage V2 due to driving of the injector 10, spontaneous discharge, or the like (time t6 in FIG. 2), the voltage boosting operation is started. The predetermined voltage V2 is set to a value lower than the predetermined voltage V1. Thus, in the injector drive system 1, substantially constant high-voltage power can be continuously supplied by the power supply unit 30.

In this embodiment, when the injection signal from the ECU 52 is inputted to the EDU 40 at time t3 in FIG. 2, the EDU 40 repeatedly turns on and off the charge switch SW1 with the discharge switch SW2 kept off. Thus, when the charge switch SW1 is turned on, a current flows from the DC-DC capacitor C2 to the piezoelectric element P and energy is accumulated in the charging/discharging coil L2. When the charge switch SW1 is turned off, a current is caused to flow to the piezoelectric element P by the energy accumulated in the charging/discharging coil L2. Therefore, the piezoelectric element P is charged with electric charges, and the piezoelectric element P is expanded to inject fuel.

When the injection signal is not inputted to the EDU 40 any more at time t4 when a time TB has passed after time t3, the EDU 40 repeatedly turns on and off the discharge switch SW2 with the charge switch SW1 kept off. Thus, when the discharge switch SW2 is turned on, a current flows from the positive pole of the piezoelectric element P, that is, from the charging/discharging coil L2 side, and further energy is accumulated in the charging/discharging coil L2. When the discharge switch SW2 is turned off, a regenerative current is caused to flow to the DC-DC capacitor C2 by the energy accumulated in the charging/discharging coil L2. Therefore, the electric charges accumulated in the piezoelectric element P are discharged, and the piezoelectric element P is contracted to terminate fuel injection. The control IC 43 monitors the voltage on the positive pole side of the piezoelectric element P When the control IC 43 detects that the voltage on the positive pole side of the piezoelectric element P has dropped to a predetermined voltage V3 or below (time t5 in FIG. 2), it stops the operation of turning on and off the discharge switch SW2.

In this embodiment, the power supply unit 30 is placed separately from and externally to the EDU 40, that is, externally to the housing 44. Therefore, it is unnecessary to radiate heat produced by the power supply unit 30 to the atmosphere through the housing 44 of the EDU 40. Therefore, even when the capacity of the power supply unit 30 is increased to increase the number of times of operation of the injector 10 and the amount of heat produced in the power supply unit 30 is increased, it is unnecessary to increase the size of the housing 44 of the EDU 40. The EDU 40 and the power supply unit 30 are constructed separately from each other. Therefore, the EDU 40 can be standardized, and the number of times of injector operation can be increased or decreased just by replacing the power supply unit 30 according to the specifications of the vehicle.

Piezoelectric injectors are superior to solenoid injectors in response speed and make it possible to increase the pressure of injected fuel. However, they require more power in operation than solenoid injectors do. Therefore, this embodiment is especially effective.

Second Embodiment

Figure 3:
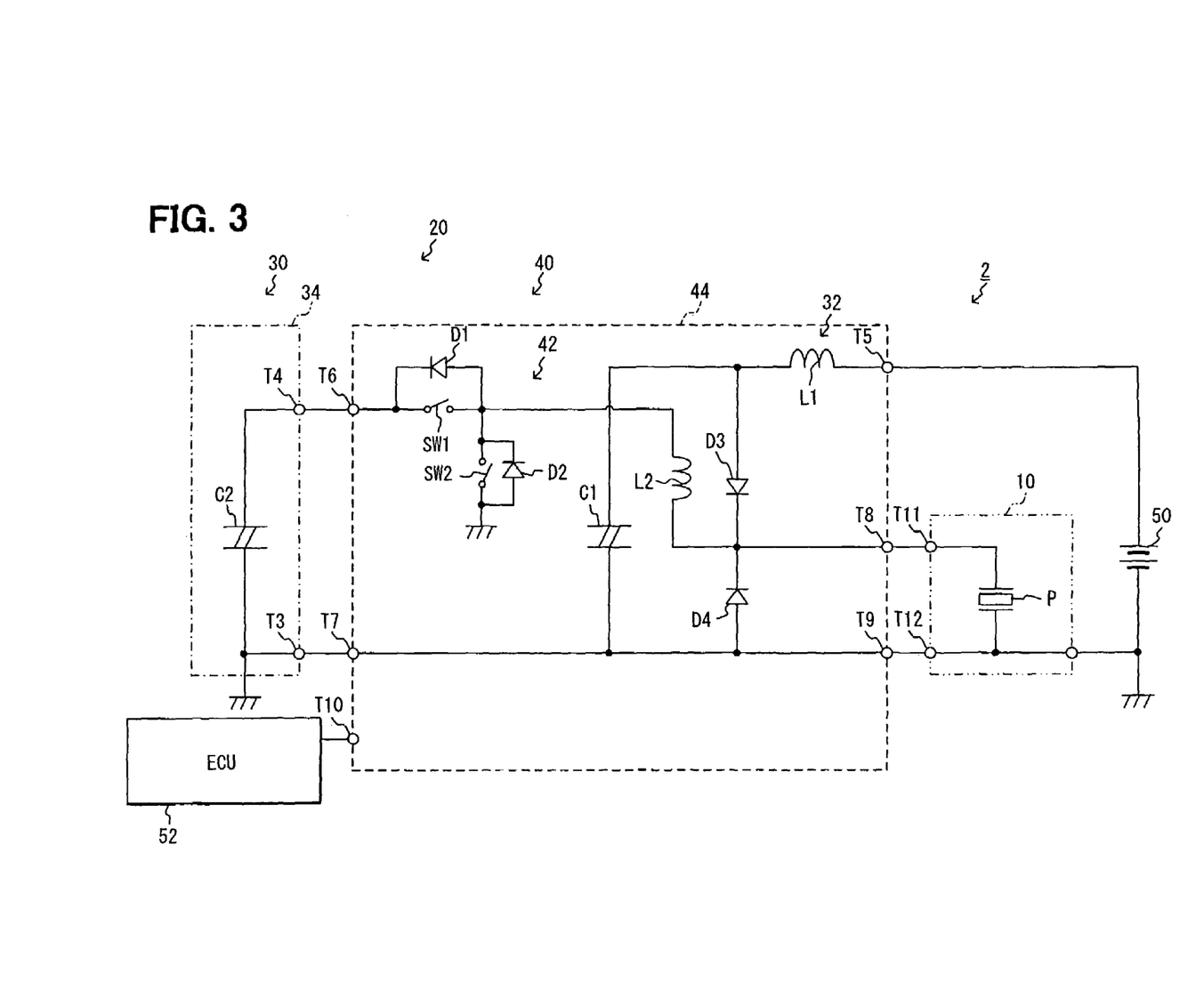
FIG. 3 is an electric circuit diagram showing an injector drive system according to a second embodiment of the present invention.

In the first embodiments power of the battery 50 is supplied directly to the power supply unit 30. In the second embodiment, power of the battery 50 is supplied by the power supply unit 30 through the EDU 40. As shown in FIG. 3, an injector drive system 2 is different from the injector drive system 1 in that the filter 32 is provided in the EDU 40, not in the power supply unit 30.

One end of the capacitor C1 of the filter 32 is connected to one end of the coil L1 of the filter 32. The other end is connected to the negative pole of the DC-DC capacitor C2, the anode of the diode D4, the end of the piezoelectric element P on the opposite side to the charging/discharging coil L2, and the negative terminal of the battery 50. The other end of the coil L1 of the filter 32 is connected to the positive terminal of the battery 50 through the terminal T5 of the EDU 40. Thus, in the injector drive system 2, power of the battery 50 is supplied by the power supply unit 30 through the injector 10 and the EDU 40.

In this embodiment, even when the capacity of the power supply unit 30 is increased to increase the number of times of injector operation and the amount of heat produced at the power supply unit 30 is increased, it is unnecessary to increase the size of the housing 44 of the EDU 40.

Since the coil L1 and capacitor C1 of the filter 32 are constructed integrally with the EDU 40, a current caused by turning on and off the discharge switch SW2 to increase the voltage of the power supply unit 30 and a current flowing from the coil L1 to the discharge switch SW2 by way of the diode D3 and the charging/discharging coil L2 do not flow outside the EDU 40. Therefore, noise produced by turning on and off the discharge switch SW2 can be reduced.

Third Embodiment

Figure 4:
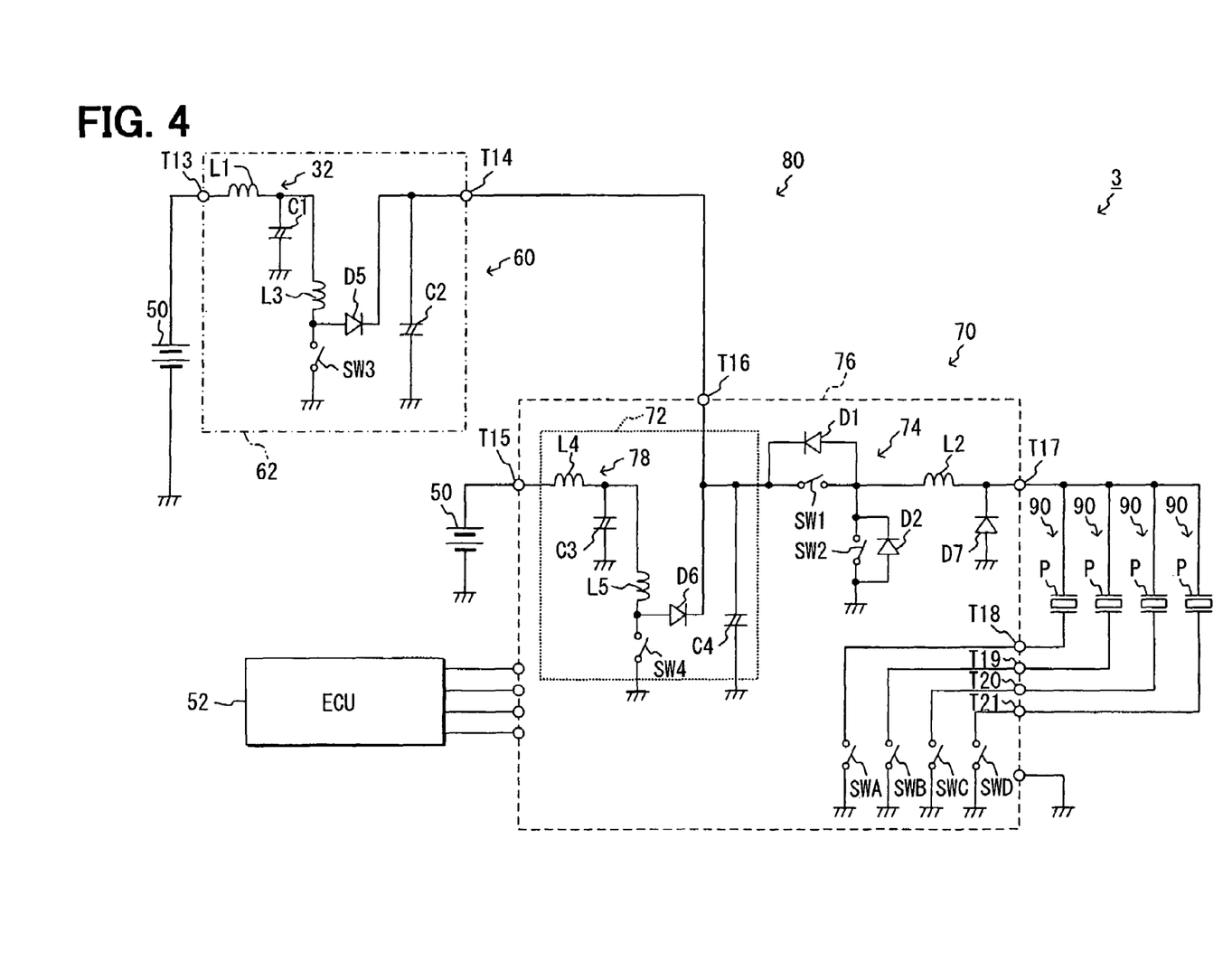
FIG. 4 is an electric circuit diagram showing an injector drive system according to a third embodiment of the present invention.

In the first and second embodiments, the EDU 40 is provided for each injector 10. In this third embodiment, one EDU 70 drives multiple (for example, four) injectors 90. As shown in FIG. 4, an injector drive system 3 in this embodiment includes an injector drive device 80 having a power supply unit 60 and an EDU 70 for the injectors 90.

The power supply unit 60 is placed externally to the EDU 70, that is, externally to its housing 76. The power supply unit 60 includes the filter 32, the DC-DC capacitor C2, a boost coil L3, a diode D5, a boost switch SW3, and a housing 62. In the housing 62 of the power supply unit 60, there are housed the filter 32, DC-DC capacitor C2, boost coil L3, diode D5, and boost switch SW3.

One end of the coil L1 of the filter 32 is connected to the positive terminal of the battery 50 through a terminal T13 provided on the housing 62, and the other end is connected to one end of the boost coil L3. The other end of the boost coil L3 is connected to the other end of the boost switch SW3 one end of which is grounded, and the point of junction between the boost coil L3 and the boost switch SW3 is connected to the anode of the diode D5. The cathode of the diode D5 is connected to the EDU 70 through a terminal T14 provided on the housing 62. One end of the capacitor C1 of the filter 32 is connected to the point of junction between the coil L1 and the boost coil L3, and the other end is grounded. The positive pole of the DC-DC capacitor C2 is connected to the point of junction between the diode D5 and the EDU 70, and its negative pole is grounded.

The EDU 70 includes a power supply unit 72, a drive unit 74, and cylinder select switches SWA to SWD. In the housing 76 of the EDU 70, there are housed the power supply unit 72, drive unit 74, and the cylinder select switches SWA to SWD.

The power supply unit 72 of the EDU 70 is supplied with power from the battery 50 and generates a voltage higher than the voltage of the battery 50. The power supply unit 72 includes a filter 78 constructed of a coil L4 and a capacitor C3, a DC-DC capacitor C4, a boost coil L5, a diode D6, and a boost switch SW4. One end of the coil L4 of the filter 78 is connected to the positive terminal of the battery 50 through a terminal T15 provided on the housing 76, and the other end is connected to one end of the boost coil L5. The other end of the boost coil L5 is connected to the other end of the boost switch SW4, one end of which is grounded. The point of junction between the boost coil L5 and the boost switch SW4 is connected to the anode of the diode D6. The cathode of the diode D6 is connected to one end of the charge switch SW1. The point of junction between the diode D6 and the charge switch SW1 is connected to the positive pole of the DC-DC capacitor C4 whose negative pole is grounded. At the same time, it is connected to the positive pole of the DC-DC capacitor C2 and the cathode of the diode D5 through a terminal T16 provided on the housing 76 and the terminal T14.

The drive unit 74 is supplied with power from the power supply unit 60 and the power supply unit 72, and drives the injectors 90. The drive unit 74 includes the charge switch SW1, discharge switch SW2, charging/discharging coil L2, control IC (not shown) that controls turn-on/off of the charge switch SW1 and the discharge switch SW2, and diodes D1, D2, D7.

One end of the charge switch SW1 is connected to the cathode of the diode D6, the positive pole of the DC-DC capacitor C4, the positive pole of the DC-DC capacitor C2, and the anode of the diode D5. The other end is connected to one end of the charging/discharging coil L2. The other end of the charging/discharging coil L2 is connected to the injectors 90 provided for the respective cylinders through a terminal T17 provided on the housing 76. The point of junction between the charging/discharging coil L2 and the injectors 90 is connected with the cathode of the diode D7 whose anode is grounded. One end of the discharge switch SW2 is connected to the point of junction between the charge switch SW1 and the charging/discharging coil L2, and the other end is grounded.

The diode D1 is provided in parallel with the charge switch SW1. The anode of the diode D1 is connected to the charge switch SW1 on the charging/discharging coil L2 side, and its cathode is connected to the charge switch SW1 on the power supply unit 72 side. The diode D2 is provided in parallel with the discharge switch SW2. The anode of the diode D2 is connected to the discharge switch SW2 on the ground side, and its cathode is connected to the discharge switch SW2 on the charging/discharging coil L2 side.

The cylinder select switches SWA to SWD are for selecting an injector 90 to be driven from among the injectors 90 provided for the respective cylinders of the engine. The select switches in the number equal to the number (four) of cylinders of the engine are provided. One end of each of the cylinder select switches SWA to SWD is grounded, and the other end is connected to the injector 90 corresponding to that cylinder select switch SWA to SWD through one of terminals T18 to T21 provided on the housing 76.

The injector 90 is a piezoelectric injector that is operated by the piezoelectric element P being expanded and contracted. There are provided the injectors 90 in the number equal to the number (four) of cylinders of the engine. One end of each injector 90 is connected to the charging/discharging coil L2 and the cathode of the diode D7 through the terminal T17 of the EDU 70, that is, the housing 76. The other end of each injector 90 is connected to the cylinder select switch SWA to SWD corresponding to that injector 90 through one of the terminals T18 to T21.

According to this injector drive system 3, the four injectors 90 are driven sequentially by the one EDU 70. Unlike the first and second embodiments, therefore, the injector drive system 3 turns on the cylinder select switch SWA to SWD corresponding to that injector 90 is turned on, fuel is injected from an injector 90, that is, when a piezoelectric element P is charged.

An injection signal for specifying an injector 90 from which fuel should be injected among the four injectors 90 is inputted to the EDU 70. When this injection signal is inputted to the EDU 80, the EDU turns on the cylinder select switch SWA to SWD corresponding to the injector 90 specified by that injection signal. Thereafter, the EDU 70 repeatedly turns on and off the charge switch SW1 with the discharge switch SW2 kept off as in the first and second embodiments. The piezoelectric element P of the injector 90 specified by the injection signal is thereby expanded to inject fuel.

Discharge of the electric charges accumulated in the piezoelectric element P is the same as in the first and second embodiments.

When one EDU 70 drives multiple (four) injectors 90, the power required for the EDU 70 to drive the injectors 90 is increased as compared with in the first and second embodiments. If power for driving the injectors 90 is supplied by only the power supply unit 72 of the EDU 70, for this reason, it is required to increase the capacity of the power supply unit 72 and the size of the EDU 70. However, in this embodiment, the power supply unit 60 is placed externally to the EDU 40, and the drive unit 74 is supplied with power at least from the power supply unit 60.

For this reason, when the power supply unit 72 is housed in the housing 76 of the EDU 7, and one EDU 70 drives multiple injectors 90 and the number of times of injector 90 operation is increased, as in this embodiment, the following measure only has to be taken, by increasing capacity of the power supply unit 60 is increased.

In this embodiment, the power supply unit 60 and the power supply unit 72 have the same functions. In this embodiment, the same voltage boosting operation as in the injector drive system 1 in the first embodiment is performed.

In the power supply unit 60 in this embodiment, the boost switch SW3 is repeatedly turned on and off and energy is thereby accumulated in the boost coil L3, and the accumulated energy is supplied to the DC-DC capacitor C2. This accumulates electric charges in the DC-DC capacitor C2 and increases the voltage of the power supply unit 60.

Also, in the power supply unit 72, the boost switch SW4 is repeatedly turned on and off and energy is thereby accumulated in the boost coil L5, and the accumulated energy is supplied to the DC-DC capacitor C4. This accumulates electric charges in the DC-DC capacitor C4 and increases the voltage of the power supply unit 72.

Figure 5:
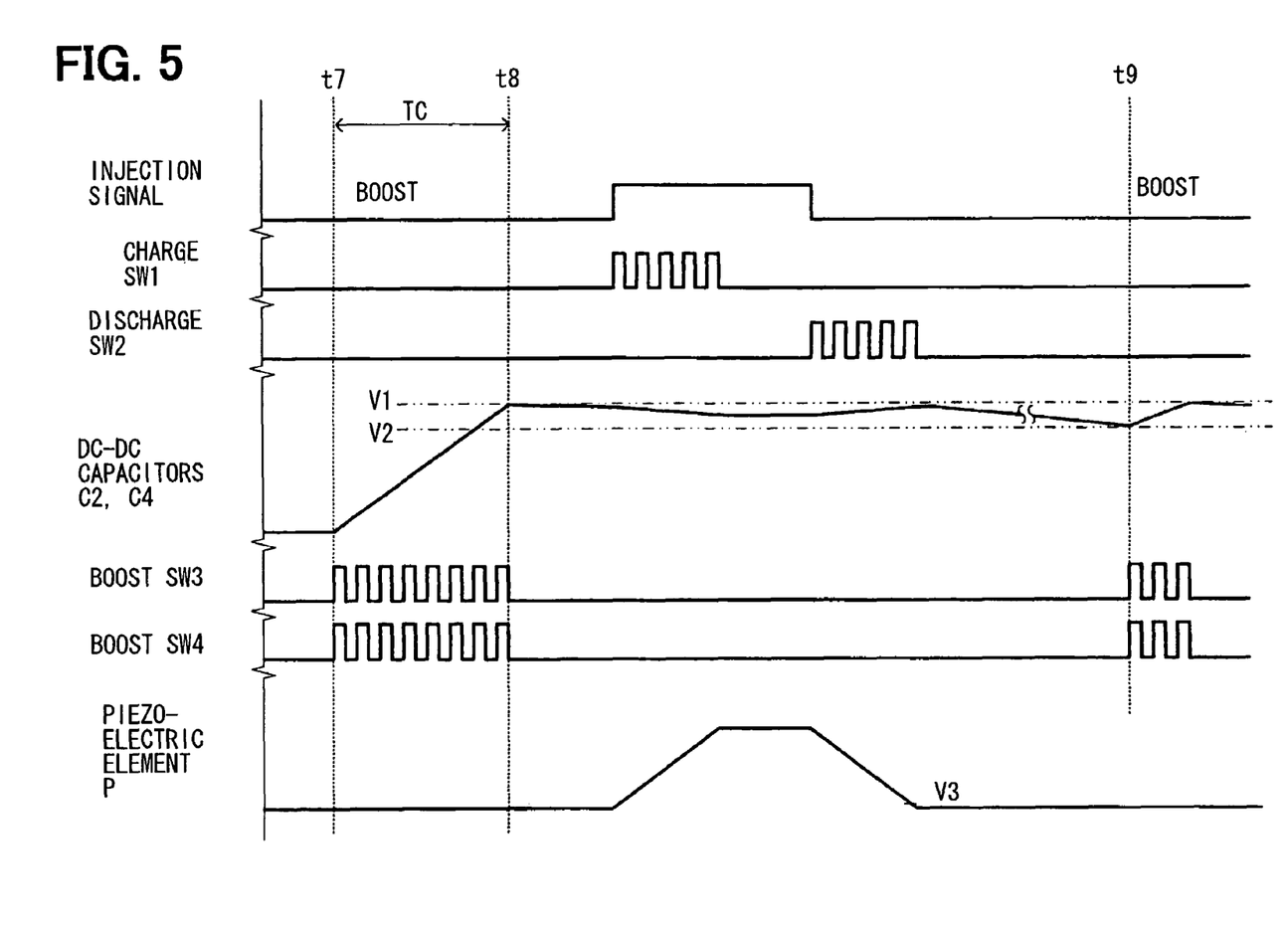
FIG. 5 is a time diagram showing the operation of the injector drive system in the third embodiment.

The power supply unit 60 and the power supply unit 72 start voltage boosting operation with the identical timing. Similarly in the first embodiment mentioned above (Refer to FIG. 2), this voltage boosting operation is started at time t7 in FIG. 5 and is performed until the voltages of the power supply unit 60 and the power supply unit 72 reach a predetermined voltage V1 at time t8 when a time TC has passed.

When the voltage of the power supply units 60, 72 drop below a predetermined voltage V2 due to driving of an injector 90, spontaneous discharge, or the like (Refer to time t9 in FIG. 5), the above voltage boosting operation is started. The predetermined voltage V2 is set to a value lower than the predetermined voltage V1. Thus, in the injector drive system 3, substantially constant high-voltage power can be constantly supplied by the power supply units 60 and 72.

The power supply unit 60 and the power supply unit 72 operate independently of each other. Therefore, the capacitor C2 and the capacitor C4 are brought to a common voltage, and when this common voltage drops, they substantially simultaneously operate. With this construction, increase in the size of the power supply unit 72, that is, increase in the size of the EDU 70 can be suppressed and the number of times of operation of injector 90 can be increased.

Also, in this embodiment, the same advantage as in the first and second embodiments mentioned above is brought. That is, even when the capacity of the power supply unit 60 is increased to increase a number of times of injector 90 operation and the amount of heat produced at the power supply unit 60 is increased, the following is implemented: it is unnecessary to increase the size of the housing 76 of the EDU 70, and thus increase in the size of the EDU 70 can be suppressed.

In this embodiment, the power supply unit 60 is a first power supply unit and the power supply unit 72 is a second power supply unit.

Fourth Embodiment

Figure 6:
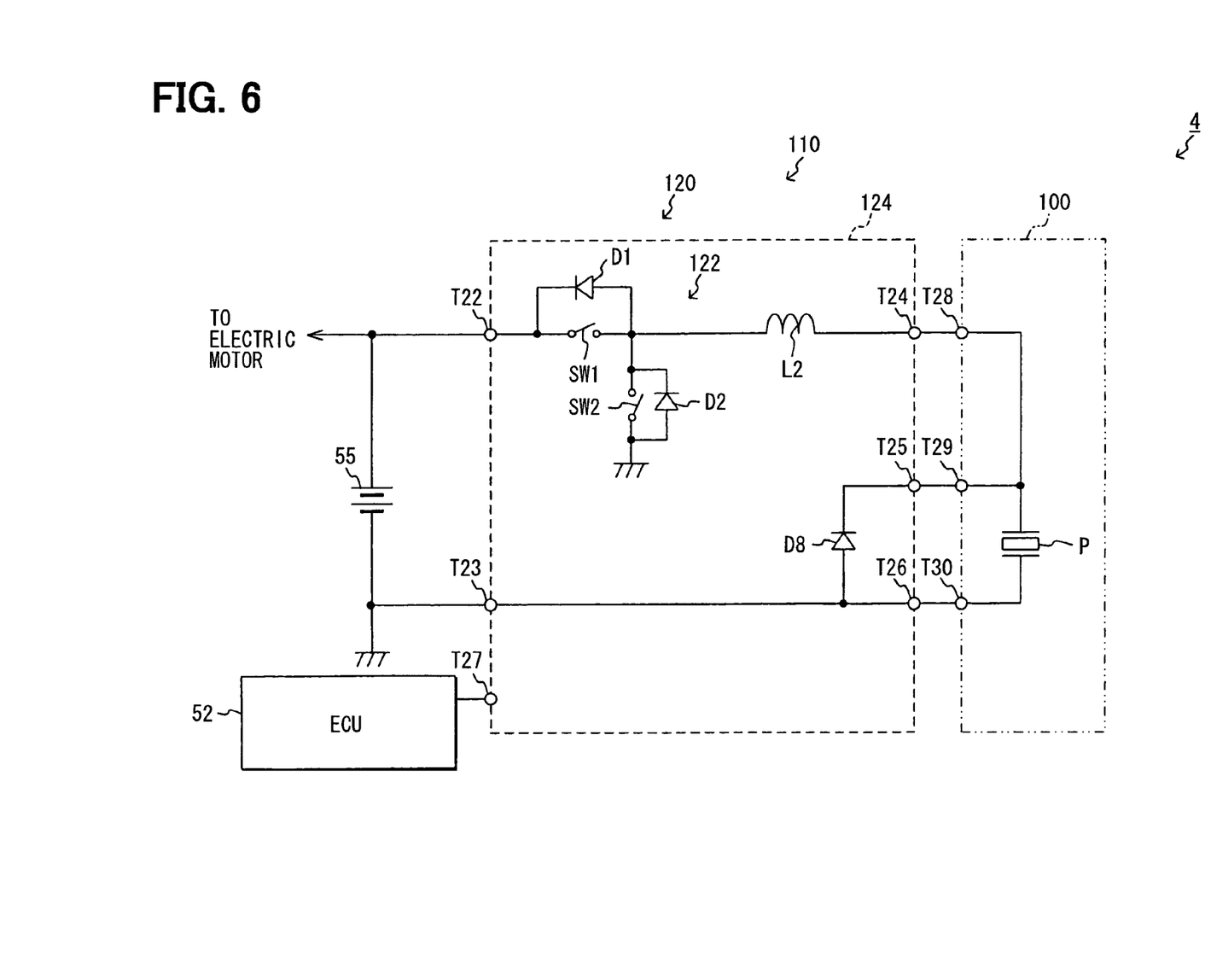
FIG. 6 is an electric circuit diagram showing an injector drive system according to a fourth embodiment of the present invention.

In the first to third embodiments, the injector drive system 1 to 3 is mounted in a vehicle using a diesel engine as a driving source. In this fourth embodiment, an injector drive system 4 is for a hybrid vehicle that runs by a combination of a diesel engine and an electric motor.

As shown in FIG. 6, the injector drive system 4 includes an injector 100 for injecting fuel into the diesel engine of the hybrid vehicle and an injector drive device 110 that drives the injector 100.

The injector drive device 110 includes a drive unit 122 that is supplied with power from the battery 55 for supplying power to the electric drive motor mounted in the hybrid vehicle and drives the injector 100, and an EDU 120 having a housing 124 for housing the drive unit 122. Since the battery 55 is for supplying power to the electric drive motor mounted in the hybrid vehicle, the battery 55 generates a high voltage of tens to hundreds of volt.

The housing 124 of the EDU 120 is provided with a terminal T22 connected to the positive terminal of the battery 55, a terminal T23 connected to the negative terminal of the battery 55, terminals T24 to T26 connected to an injector 100, and a terminal T27 connected to the ECU 52. The drive unit 122 is connected directly to the terminal T27 without a circuit element placed between it and the terminal T27. The drive unit 122 includes the charge switch SW1, the discharge switch SW2, and diodes D1, D2, D8.

One end of the charge switch SW1 is connected to the positive terminal of the battery 55 through the terminal T22, and the other end is connected to the injector 100 through the terminal T24. One end of the discharge switch SW2 is connected to the point of junction between the charge switch SW1 and the injector 100, and the other end is grounded.

The diode D1 is provided in parallel with the charge switch SW1. The cathode of the diode D1 is connected to the charge switch SW1 on the battery 55 side, and its another is connected to the charge switch SW1 on the injector 100 side. The diode D2 is provided in parallel with the discharge switch SW2. The anode of the diode D2 is connected to the discharge switch SW2 on the ground side, and its cathode is connected to the discharge switch SW2 on the charge switch SW1 side.

The anode of the diode D8 is connected to the negative terminal of the battery 55 through the terminal T23, and further connected to one end of the piezoelectric element P of the injector 100 through the terminal T26. The cathode of the diode D8 is connected to the other end of the piezoelectric element P of the injector 100 through the terminal T25.

As in the first embodiment, the injector 100 includes the piezoelectric element P, connector terminals T28 to T30 connected to the terminals T24 to T26 of the EDU 120, and a connector case (not shown). One end of the piezoelectric element P is connected to the anode of the diode D8 through the terminals T26 and T30, and further connected to the negative terminal of the battery 55 through the terminal T23. The other end is connected to one end of the charging/discharging coil L2 through the terminals T24 and T28. The other end of the charging/discharging coil L2 is connected to the point of junction between the charge switch SW1 and the discharge switch SW2.

The point of junction between the piezoelectric element P and the charging/discharging coil L2 is connected to the cathode of the diode D8 through the terminals T25 and T29. In this embodiment, the battery 55 can output a high voltage of tens to hundreds of volt. Therefore, it is unnecessary to separately provide a power supply unit that generates high voltage. For this reason, an injector drive system for hybrid vehicles can also be used as an injector system for ordinary vehicles that run only on an internal combustion engine.

When the injector drive system 4 is applied to an ordinary vehicle, the power supply unit 30 only has to be separately provided externally to the EDU 40 as in the first embodiment. When the injector drive system 4 is applied to a hybrid vehicle, the positive terminal of the battery 55 only has to be connected to the terminal T22 without providing a power supply unit in the injector drive device 110 as in this embodiment.

In this embodiment, therefore, increase in the size of the EDU 120 can be suppressed, and further the injector drive system for a hybrid vehicle can also be used as an injector drive system for ordinary vehicles and increase in the number of times of operation of injector 100 can be coped with.

Other Embodiments

In the third embodiment, the power supply units 60, 72 are provided internally and externally to the EDU 70. In this case, the EDU 70 only has to be supplied with power at least from the power supply unit 60 of the two power supply units 60, 72 when driving the injector 90. The power supply unit 72 need not be used. The EDU 70 may be integrated with the ECU 52.

In the fourth embodiment, the invention is applied to the hybrid vehicle that runs on a combination of the diesel engine and the electric motor. The invention can be applied to any kind of hybrid vehicle as long as it runs on a combination of the internal combustion engine and the electric motor. For example, it is applicable to the hybrid vehicle that runs on a combination of a gasoline engine and the electric motor.

When a battery that generates a high voltage of tens to hundreds of volt is mounted in a vehicle, the injector drive system in the fourth embodiment may be adopted as the injector drive system for the vehicle.

Although the drive unit 42 of the EDU 40 is directly connected to the terminal T6, a circuit element such as a resistor that has no influence on the operation of the drive unit 42 may be placed between the terminal T6 and the drive unit 42.

In the above embodiments, the operation of turning on and off the discharge switch SW2 is stopped when the voltage of the positive pole of the piezoelectric element P drops to the predetermined voltage V3 or below. However, this on/off operation may be stopped when a predetermined time has passed after the operation of turning on and off the discharge switch SW2 was started. It is advisable to set this predetermined time to a time longer than the time until discharge of electric charges by the piezoelectric element P is terminated.

What is claimed is:

1. An injector drive device that drives an injector for supplying fuel into an internal combustion engine of an engine-motor hybrid vehicle, the hybrid vehicle having an electric motor, comprising:
    a drive switch unit having driving means that is supplied with power from a battery, which also supplies power to the electric motor, and drives an injector, and a housing for housing the driving means; and
    an input terminal that is provided on the housing and to which power from the battery is inputted,
    wherein the driving means is directly connected to the input terminal,
    wherein the driving means includes:
        a charge/discharge coil;
        a charge switch connected in series with the battery and the injector for charging the injector through the charge/discharge coil by the power of the battery when turned on;
        a diode connected in parallel to the charge switch; and
        a discharge switch connected to the charge switch, the diode and the charge/discharge coil at one end and grounded at the other end for discharging the injector through the charge/discharge coil and the diode to the battery to be stored therein.

2. An injector drive device that drives an injector for injecting fuel by electric power of a battery, comprising:
    a drive switch unit having driving means that receives a voltage of the battery and generates a boost voltage higher than the voltage before the injector is driven, the drive switch unit further having a housing for housing the driving means therein and an input terminal provided in the housing; and
    a power supply unit that stores and supplies the boost voltage,
    wherein the power supply unit is placed externally to the housing of the drive switch unit and connected to the driving means through the input terminal, and
    wherein the driving means is configured to apply the boost voltage to the power supply unit through the input terminal to be stored in the power supply unit, and to receive the boost voltage stored in the power supply unit through the input terminal to drive the injector by the boost voltage received from the power supply unit.

3. The injector drive device according to claim 2, wherein the driving means includes:
- a charge switch connected in series with the input terminal and the injector for applying the boost voltage stored in the power supply unit to the injector when turned on;
- a diode connected in parallel to the charging switch;
- a boost coil; and
- a discharge switch connected to the charging switch, the diode and the boost coil at one end and grounded at the other end for turning on and off to cause the boost coil to generate the boost voltage.

4. The injector drive device according to claim 2, wherein:
- the housing of the drive switch unit further has another input terminal for receiving the voltage of the battery; and
- the power supply unit includes a housing having a first terminal connected to the battery, a second terminal for applying the voltage of the battery to the another input terminal, a third terminal connected to the input terminal of the drive switch unit, and a capacitor connected to the third terminal for storing the boost voltage.

5. The injector drive device according to claim 2, wherein:
- the drive switch unit includes another input terminal connected to the battery; and
- the power supply unit includes a housing having an input terminal connected to the input terminal of the drive switch unit, and a capacitor for storing the boost voltage applied through the input terminals.

6. An injector drive device that drives an injector for injecting fuel by electric power of a battery, comprising:
- a first power supply unit that receives a voltage of the battery and generates a first boost voltage higher than the voltage of the battery; and
- a drive switch unit having a second power supply unit that receives the voltage of the battery and generates a second boost voltage higher than the voltage of the battery, driving means that drives the injector by the first and the second boost voltages, the drive switch unit further having a housing for housing the second power supply unit and the driving means therein,
- wherein the first power supply unit is placed externally to the housing of the drive switch unit and connected in parallel to the second power supply unit.

7. The injector drive device according to claim 6, wherein:
each of the first power supply unit and the second power supply unit includes:
- a boost coil;
- a boost switch connected to the boost coil for turning on and off to cause the boost coil to generate the boost voltage; and
- a capacitor connected to the boost coil to store the boost voltage.

* * * * *